US008781876B2

(12) United States Patent  
Tamura et al.

(10) Patent No.: US 8,781,876 B2  
(45) Date of Patent: Jul. 15, 2014

(54) COMPUTER PRODUCT, CHARGE CALCULATING APPARATUS, AND CHARGE CALCULATING METHOD

(75) Inventors: Masahisa Tamura, Kawasaki (JP); Yasuo Noguchi, Kawasaki (JP); Kazutaka Ogihara, Kawasaki (JP); Tetsutaro Maruyama, Kawasaki (JP); Yoshihiro Tsuchiya, Kawasaki (JP); Takashi Watanabe, Kawasaki (JP); Tatsuo Kumano, Kawasaki (JP); Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 12/905,678

(22) Filed: Oct. 15, 2010

(65) Prior Publication Data  
US 2011/0093409 A1 Apr. 21, 2011

(30) Foreign Application Priority Data  
Oct. 20, 2009 (JP) ................................. 2009-241489

(51) Int. Cl.  
*G06F 17/00* (2006.01)  
*G06Q 30/02* (2012.01)

(52) U.S. Cl.  
CPC ............ *G06Q 30/0283* (2013.01); *G06F 17/60* (2013.01)  
USPC .............................. 705/7.35; 705/80; 705/400

(58) Field of Classification Search  
CPC . G06Q 30/00; G06Q 30/0284; G06Q 50/188; G06Q 30/0206  
USPC ..................................... 705/7.35, 400, 40, 80  
See application file for complete search history.

(56) References Cited

U.S. PATENT DOCUMENTS

| 6,988,087 | B2 * | 1/2006 | Kanai et al. ..................... 705/80 |
| 7,765,167 | B2 * | 7/2010 | Prahlad et al. ................ 705/400 |
| 2003/0065759 | A1 * | 4/2003 | Britt et al. ..................... 709/223 |
| 2004/0260658 | A1 * | 12/2004 | Dettinger et al. ............. 705/400 |
| 2009/0313155 | A1 * | 12/2009 | Sawada et al. .................. 705/34 |
| 2010/0063911 | A1 * | 3/2010 | Gladwin et al. ................ 705/34 |
| 2010/0332401 | A1 * | 12/2010 | Prahlad et al. .................. 705/80 |

FOREIGN PATENT DOCUMENTS

| JP | 2001-356947 A | 12/2001 |
| JP | 2002-236809 A | 8/2002 |
| JP | 2002236809 A * | 8/2002 |
| JP | 2004-310357 A | 11/2004 |
| JP | 2006-011786 A | 1/2006 |

OTHER PUBLICATIONS

Vellante, David, "Dedupe Rates Matter . . . Just Not as Much as You Think" Apr. 9, 2010, Wikibon Blog, 3 pages.*  
Japanese Office Action mailed Apr. 3, 2012 for corresponding Japanese Application No. 2009-241489, with English-language Translation.

* cited by examiner

*Primary Examiner* — John Hayes  
*Assistant Examiner* — Freda A Nelson  
(74) *Attorney, Agent, or Firm* — Fujitsu Patent Center

(57) ABSTRACT

A non-transitory computer-readable recording medium stores therein a charge calculating program that causes a computer that manages a database of different data items to execute recording for each data item, information indicating the number of clients that receive the data item; extracting from the information recorded at the recording and for each data item to be received by a given client, information indicating the number of clients receiving the data item; calculating charges for the given client, based on the extracted information; and outputting the calculated charges.

9 Claims, 12 Drawing Sheets

FIG.6

| TIME | USER A | USER B | ... | USER N |
|---|---|---|---|---|
| 0 | 86 | 47 | ... | 10294 |
| ts | 90 | 48 | ... | 10582 |
| 2×ts | 94 | 50 | ... | 10592 |
| 3×ts | 51 | 50 | ... | 10101 |
| 4×ts | 53 | 50 | ... | 10101 |
| 5×ts | 94 | 51 | ... | 10111 |
| ... | | | | |
| s×ts | 92 | 48 | ... | 11945 |

FIG.7

| TIME | USER A | USER B | ... | USER N |
|---|---|---|---|---|
| 0 | 1.5 | 9.2 | ... | 125.1 |
| td | 1.8 | 9.3 | ... | 123.1 |
| 2×td | 2.3 | 10.2 | ... | 130.1 |
| ... | | | | |
| d×td | 3.9 | 8.1 | ... | 111.1 |

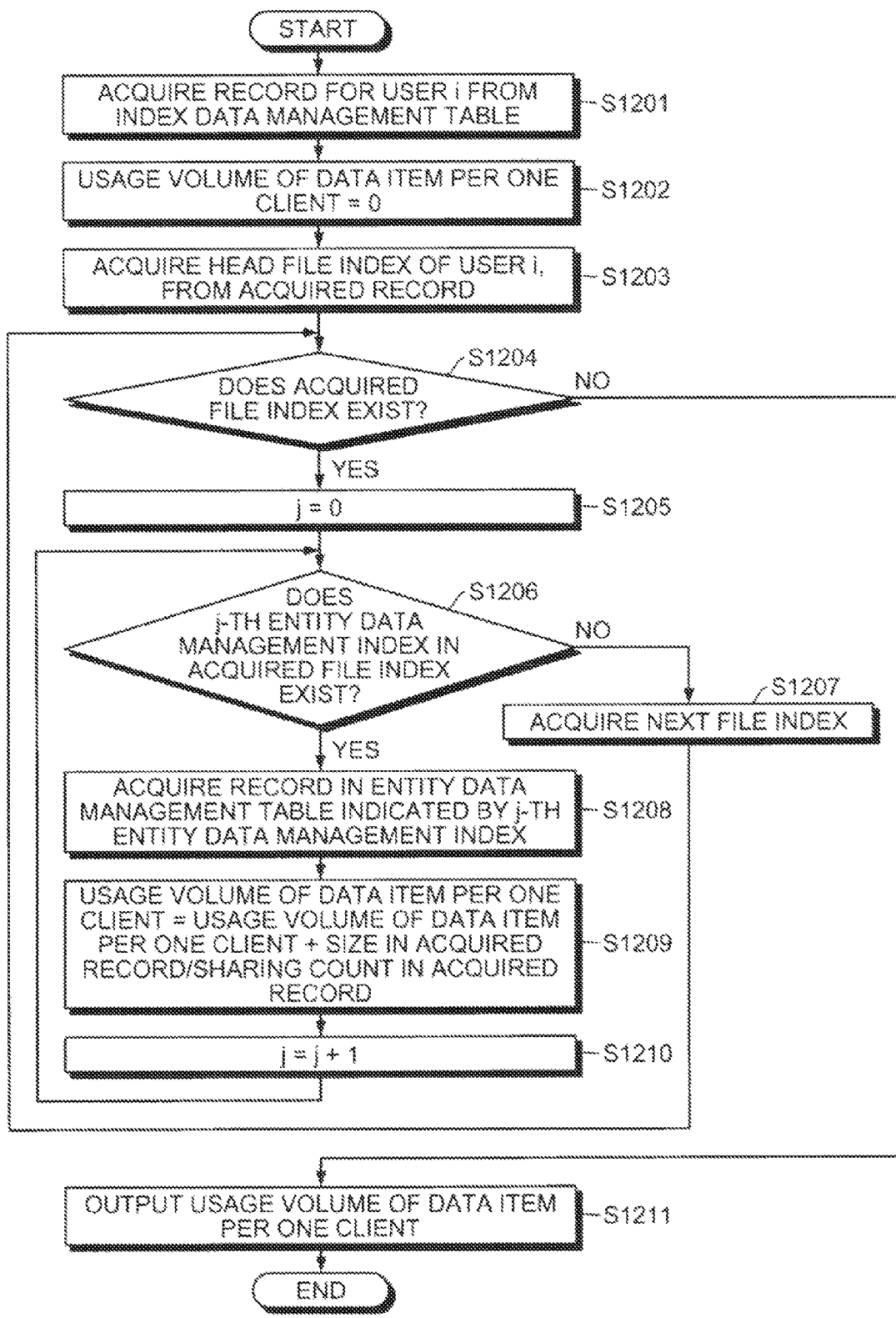

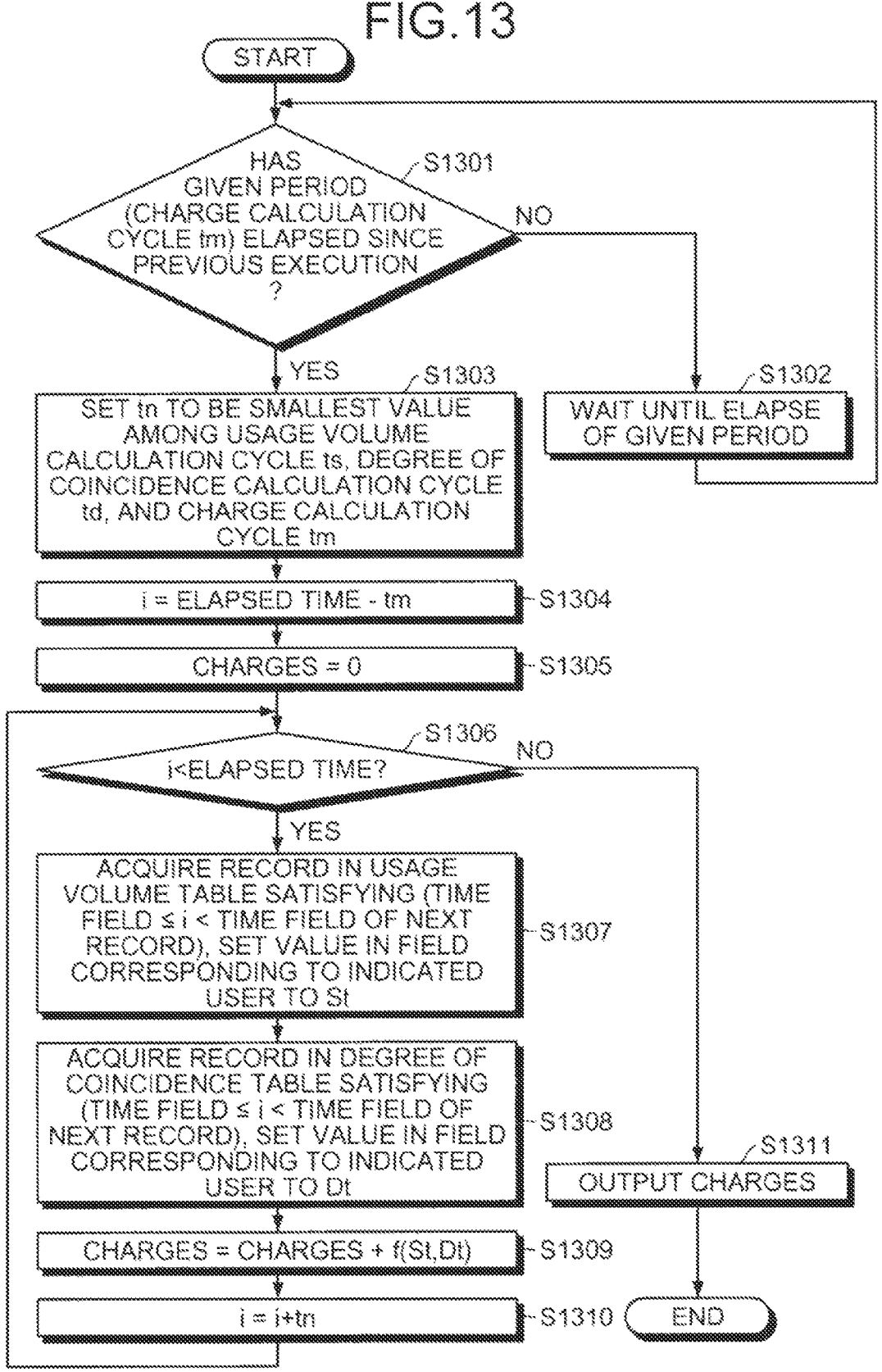

COMPUTER PRODUCT, CHARGE CALCULATING APPARATUS, AND CHARGE CALCULATING METHOD

CROSS REFERENCE TO RELATED APPLICATIONS

This application is based upon and claims the benefit of priority of the prior Japanese Patent Application No. 2009-241489, filed on Oct. 20, 2009, the entire contents of which are incorporated herein by reference.

FIELD

The embodiment discussed herein is related to calculating charges for use of a storage system.

BACKGROUND

For conventional storage systems, charges are set according to the capacity allocated to a user or the volume of data used by the user. In recent years, storage systems have come to include deduplication technology that retains only one data entity for data used by a user and further maintains a data entity index indicative of data entities for data of the same content.

Storage systems adopting such data deduplication technology are distinctive in that data of the same content consumes significantly less storage space than data that is not of the same content. Further, in storage systems adopting data deduplication technology, the data volume used by a user and the actual storage capacity required differs according to the volume of data that is of the same content.

As described, storage systems adopting data deduplication technology can record more data than storage systems that do not adopt data deduplication technology. Thus, administrators of storage systems adopting data deduplication technology can set lower charges for the same usage volume than the charges assessed for storage systems that do not adopt data deduplication technology.

In a state where low charges are set as described, if a user primarily uses data that does not coincide in terms of content, the charges assessed to the user are not proportionate with the volume of data used on the storage system, resulting in a possibility that overhead costs of storage system cannot be recovered. Thus, a billing method compatible with data deduplication technology has become necessary.

For example, Japanese Laid-Open Patent Publication No. 2006-11786 recites a deduplication method of a storage system that shares data, where a common disk is prepared and files that have been subject to deduplication in the form of "master+diff" for each file are stored. Thus, if the disk is shared by n persons, the volume of the disk used (≈charges) is 1/n. Japanese Laid-Open Patent Publication No. 2002-236809 recites a deduplication method in which documents are stored to a server and deduplication is performed in the form of a sharing of the documents. The latter publication further recites that if maintenance cost is a unit time cost of $\alpha$ (yen/KB), the size of document A is $\beta$(KB), and the number of users of document A is N (persons), charges are $(\alpha \times \beta)/n$. The more a file is shared, the lower the cost is to the users.

Nonetheless, in the method recited in Japanese Laid-Open Patent Publication No. 2006-11786, the deduplication method is performed by file, while charges are assessed by disk. In this case, the charges assessed to a user using a small portion of a disk and a user using nearly an entire disk are equivalent. Thus, a problem arises in that the degree to which the volume used by a user affects the disk capacity of the storage system is not reflected in the charges assessed to the user.

Furthermore, in Japanese Laid-Open Patent Publication No. 2002-236809, even if the background image is the same, if the text differs, the data is saved as a separate document file. Therefore, a problem arises in that the sharing count becomes inaccurate and the degree to which usable disk capacity of the storage system is affected by the usage volume of the user is reflected, with poor accuracy, on the charges assessed to the user.

Thus, with the conventional technologies, even when the sharing count of data is large, despite contributing to a reduction in the amount of disk space used, if the data size is large, the charges increase, arising in a mismatch. Similarly, even if data size is small, a small sharing count invites an increase in the amount of disk space consumed, arising again in a mismatch since the charges decrease. Therefore, a sense of unfairness in terms of billing may arise among users.

SUMMARY

According to an aspect of an embodiment, a non-transitory computer-readable recording medium stores therein a charge calculating program that causes a computer that manages a database of different data items to execute recording for each data item, information indicating the number of clients that receive the data item; extracting from the information recorded at the recording and for each data item to be received by a given client, information indicating the number of clients receiving the data item; calculating charges for the given client, based on the extracted information; and outputting the calculated charges.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 depicts an example of a usage volume table of data usage according to user.

FIG. 7 depicts an example of a degree of coincidence table for data used by each user.

FIG. 12 is a flowchart of usage volume calculation processing to calculate for each data item used by one user, the usage volume of the data item per one client.

FIG. 13 is a flowchart of charge calculation processing for one user.

DESCRIPTION OF EMBODIMENTS

Preferred embodiments of the present invention will be explained with reference to the accompanying drawings.

Figure 1:
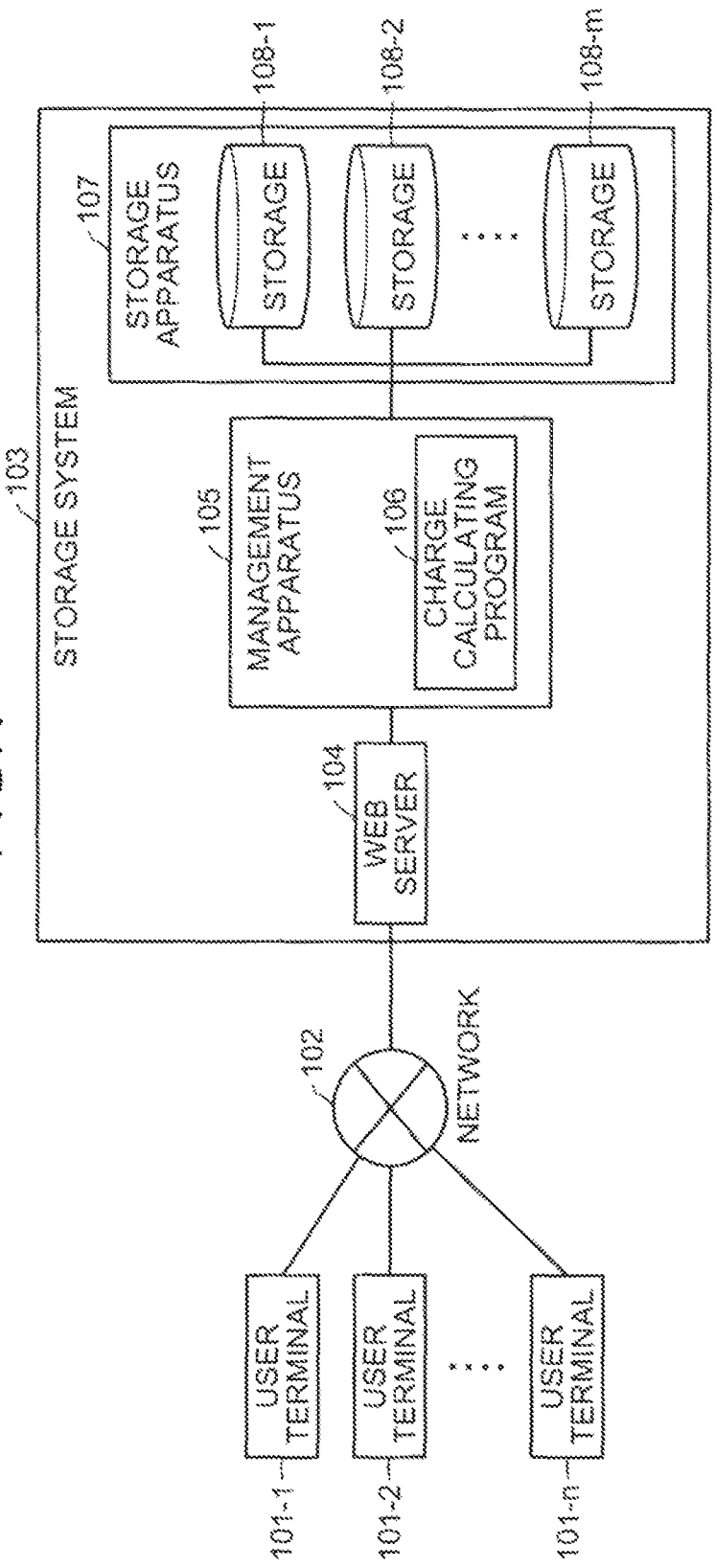
FIG. 1 is a block diagram of a storage system according to an embodiment.

FIG. 1 is a block diagram of a storage system according to an embodiment. A storage system 103 includes a web server 104, a management apparatus 105, and a storage apparatus 107. User terminals 101-1 to 101-n are clients using the storage system and are connected to the storage system 103 by a network 102, such as the Internet, a local area network (LAN), a wide area network (WAN), etc.

The user terminals 101-1 to 101-n are quintessentially personal computers (PC) that use the storage system 103 by connecting to the web server 104, for example, via a Web browser. The management apparatus 105 manages the storage system 103. Further, the management apparatus 105 internally includes a charge calculating program 106. As one example of processing, the management apparatus 105 requests the storage of data from the web server 104 to the storage apparatus 107.

The charge calculating program 106 is executed by the management apparatus 105. The management apparatus 105 acquires the usage state of the storage apparatus 107 and calculates charges. The storage apparatus 107 internally includes multiple storage units 108-1 to 108-m, which store entity data.

Figure 2:
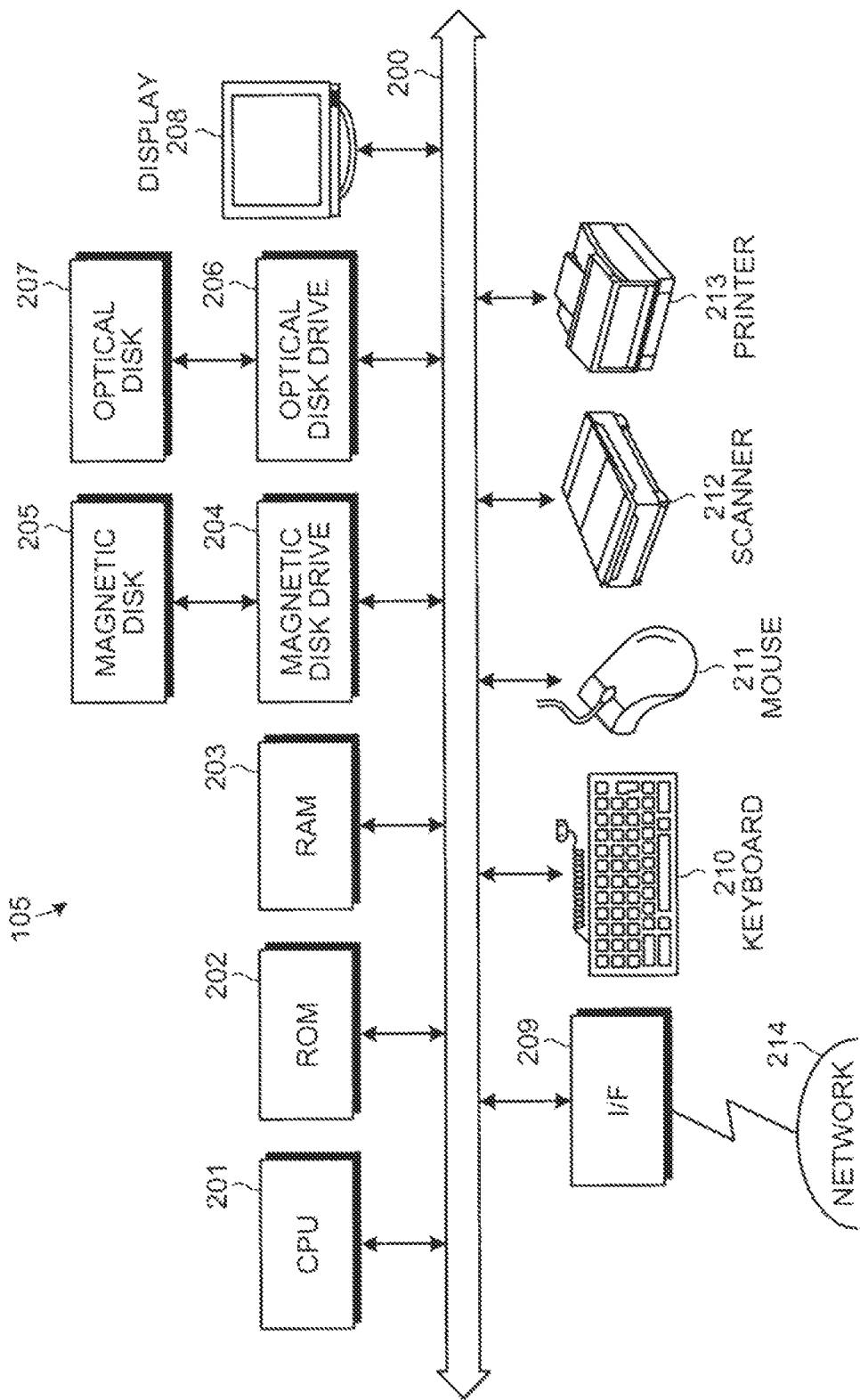
FIG. 2 is a block diagram of a hardware configuration of a management apparatus.

FIG. 2 is a block diagram of a hardware configuration of a management apparatus 105 according to the embodiment. As depicted in FIG. 2, the management apparatus 105 includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the management apparatus 105. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, function information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other apparatuses of the storage system 103 through the network 214. The network 214 is an internal network of the storage system 103 and is different from the network 102. If the management apparatus 105 is connected to a destination external to the storage system 103, the networks may be the same. The I/F 209 administers an internal interface with the network 214 and controls the input/output of data from/to external apparatuses. For example, a modem or a LAN adaptor may be employed as the I/F 209.

Figure 3:
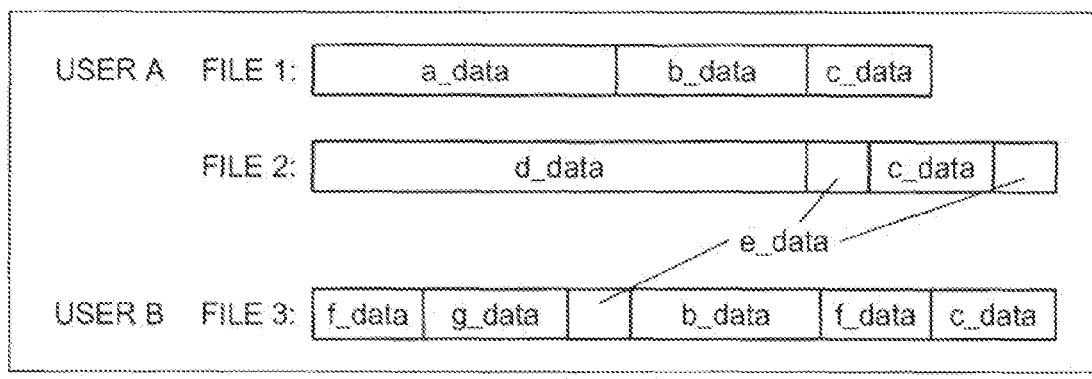
FIG. 3 depicts an image of data stored by a storage system that does not perform deduplication.

FIG. 3 depicts an image of data stored by a storage system that does not perform deduplication. User A stores files 1 and 2. User B stores file 3. File 1 has three portions including a_data, b_data and c_data. File 2 has four portions including d_data, e_data, c_data, and e_data. File 3 has 6 portions including f_data, g_data, e_data, b_data, f_data, and c_data.

Among the portions, those having the same name, are of the same content. For example, e_data of the second and the fourth portions of file 2, from the left, are of the same content. Further, c_data of the third portion of file 1, from the left, and of the sixth portion of file 3, from the left, are of the same content. As described, the storage method of a storage system that does not perform deduplication is a method of respectively establishing regions for data, even if the data is of the same content.

Figure 4:
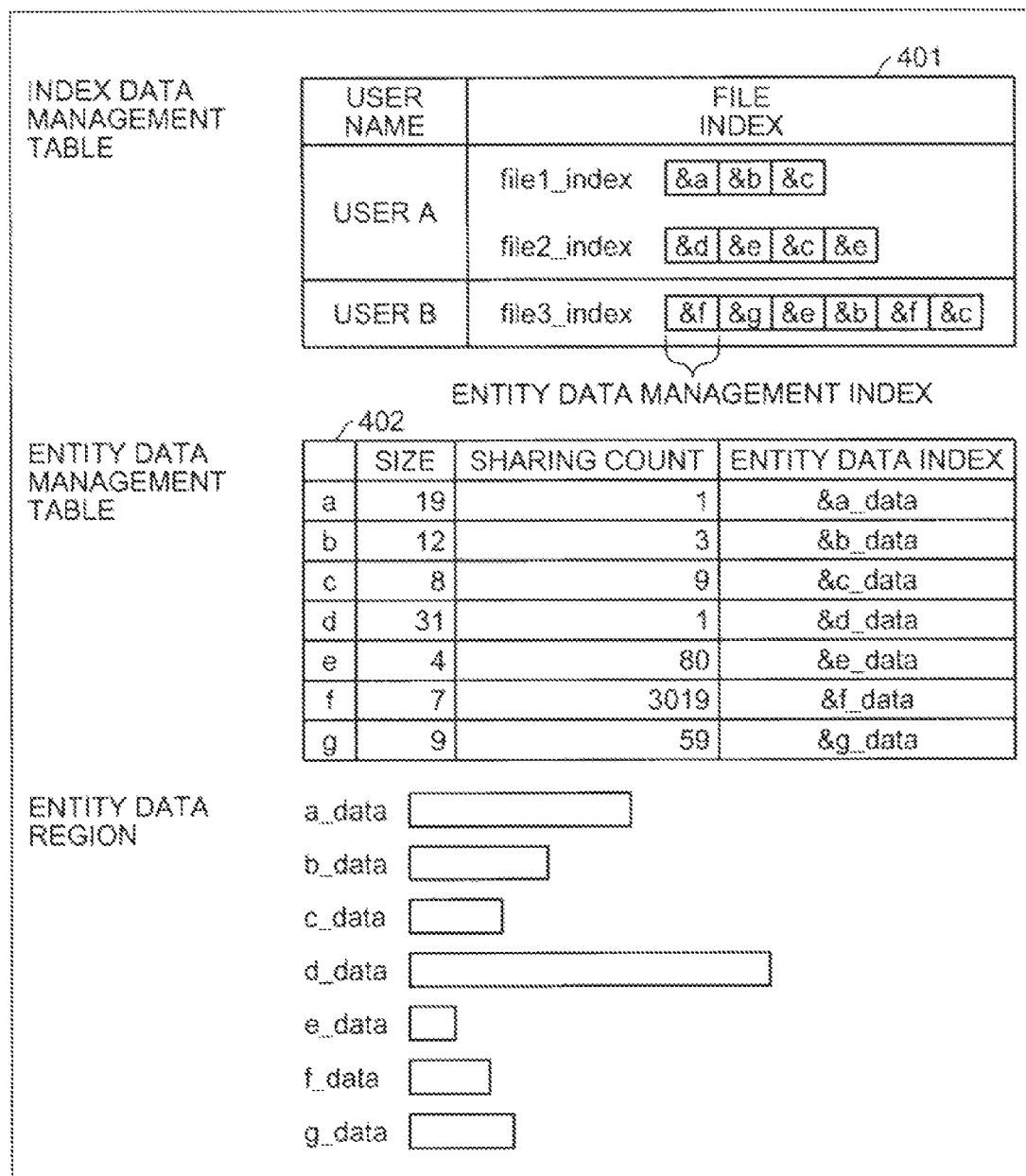
FIG. 4 depicts an image of data stored by a storage system that performs deduplication.

FIG. 4 depicts an image of data stored by a storage system that performs deduplication. The storage system 103 depicted in FIG. 1 uses three regions to manage entity data. The three regions include an index data management table 401, an entity data management table 402, and an entity data region.

The index data management table 401 stores user names and a file index of the files stored by each user. In this example, a file index is an entity data management index for managing entity data that are fragments of a file. For example, in FIG. 3, file 1 used by user A includes a_data, b_data, and c_data, while in FIG. 4, file 1 includes &a, &b, and &c. Here, the & operator represents an entity data index. For example, &a represents index a. Similarly, file 2 includes &d, &e, &c, and &e; file 3 includes &f, &g, &e, &b, &f, and &c.

The entity data management table 402 is for managing entity data. Each of the records includes size, sharing count, and an entity data index. Size is the data size of an entity data. Sharing count is the total number of times a given entity data is transmitted as indicated by the corresponding entity data management index and the file index used by the management apparatus 105 to send the entity data to a client. For example, for entity data a, &a appears in one place; for entity data b, &b appears in three places. The entity index is indicative of entity data. For example, &a data represents an index pointing to a data.

The entity data region manages an entity data group. The index data management table 401, the entity data management table 402, and the entity data region depicted in FIG. 4 are managed by a deduplication program that is in the management apparatus 105 and has a data deduplication function. The deduplication program has a function of an acquiring unit 502 and an updating unit 503 depicted in FIG. 5 hereinafter. In terms of the timing of execution, the deduplication program is executed each time a user newly adds, updates, or deletes information, or alternatively, is executed at constant intervals.

If data is newly added or updated, the management apparatus 105 uses the deduplication program to confirm whether data identical to or equivalent to data that has been newly added or updated already resides in the entity data region. If identical data is present, the management apparatus 105 increments the sharing count of the corresponding record in the entity data management table 402 and gives indication of the record in the file index. If data has been updated, the management apparatus 105 deletes the given data present prior to the update. The deletion method is equivalent to the data deletion described hereinafter.

If data has been deleted, the management apparatus 105 deletes the corresponding file index and reduces, by 1, the sharing count of all the records in the entity data management table 402 concerning the entity data indicated by the file index. Consequently, if the sharing count field of a record becomes 0, the record and the entity data indicated by the entity data index are deleted.

Figure 5:
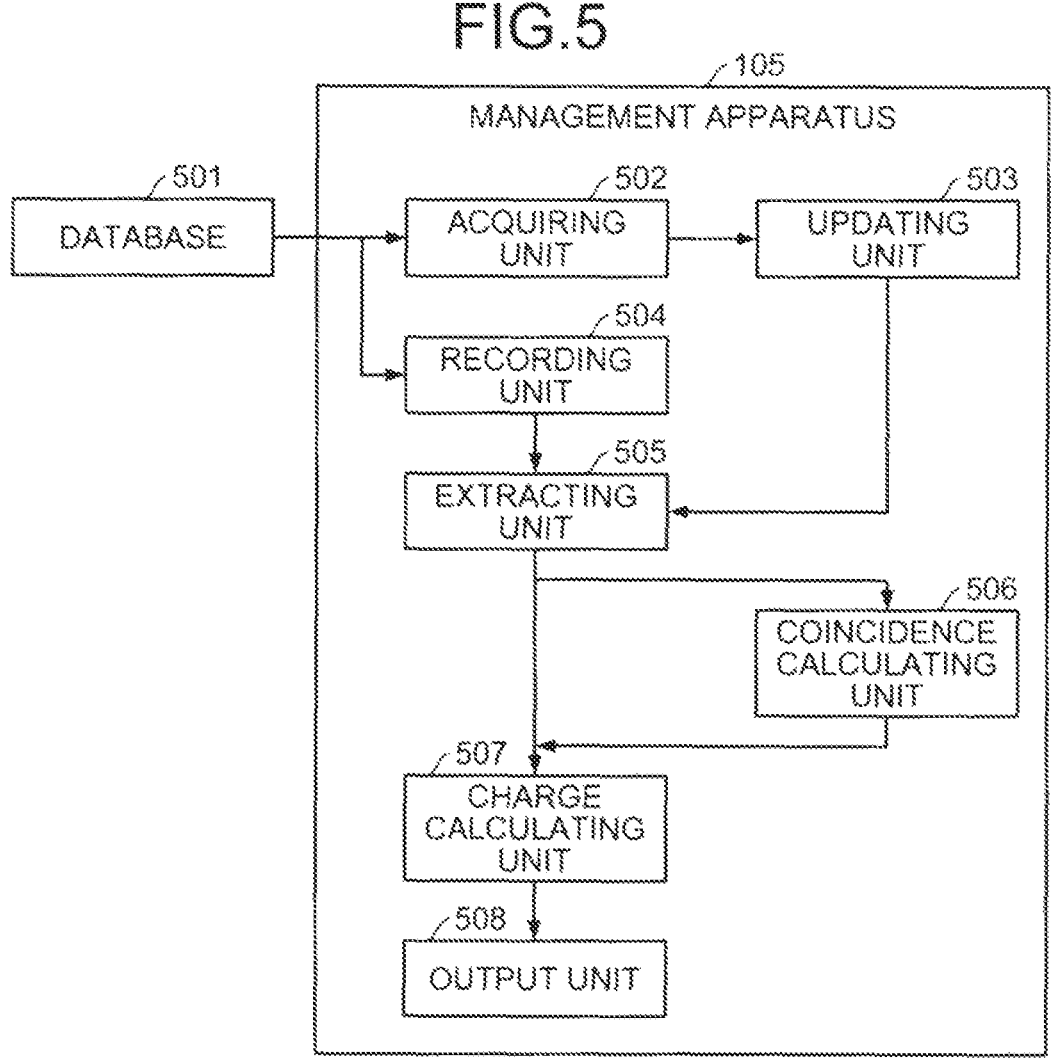
FIG. 5 is a functional diagram of the management apparatus.

FIG. 5 is a functional diagram of the management apparatus 105. The management apparatus 105 storing therein the charge calculating program 106 includes an acquiring unit 502, an updating unit 503, a recording unit 504, an extracting unit 505, a coincidence calculating unit 506, a charge calculating unit 507, and an output unit 508. The management apparatus 105 is connected to a database 501.

The charge calculating program 106 resides in the management apparatus 105, is configured by the recording unit 504, the extracting unit 505, the charge calculating unit 507, and the output unit 50 and, may include the acquiring unit 502 and the updating unit 503, or may include the coincidence calculating unit 506. Further, the charge calculating program 106 may reside on a computer different from the management apparatus 105

Functions (the acquiring unit 502 to the output unit 506) serving as a control unit, for example, are implemented by the execution of programs stored in the ROM 202, the RAM 203, the magnetic disk 205, and the optical disk 207 depicted in FIG. 2, the programs being executed by the CPU 201. Further, the functions may be implemented by another CPU via the I/F 209.

The database 501 is a region storing different types of data, i.e., data items, and may be a part of or independent of the management apparatus 105. Data items may be file elements that are combined to form a file. A client is a user terminal that uses a file. When a user terminal uses data items or a file, the management apparatus 105 combines and transmits data items to the user terminal. When data items are combined, if multiple data items of the same content are to be used, one data item of the content is used commonly, such as described with reference to FIG. 4.

Further, if one user terminal has plural types of data items and some of the data items forming a file are to be shared, since the client to receive the data items is indicated according to file, there are plural pieces of information indicating the number of clients. The database 501 corresponds with the storage units 108-1 to 108-m in the storage apparatus 107 depicted in FIG. 1.

The acquiring unit 502 has a function of acquiring, related to the data items stored in the database 501, the number of data items to be provided to each client. For example, the number of records in the entity data management table 402 depicted in FIG. 4 is acquired. The acquired file is stored to a recording region such as the RAM 203, the magnetic disk 205, and the optical disk 207.

The updating unit 503 has a function of updating for each data item recorded by the recording unit 504, information indicating the number of clients, e.g., user terminals, to receive the data item, the updating being based on the data acquired by the acquiring unit 502. For example, assuming that a file constituting three data items A, B, and C has been updated by user terminal 101-1, if data item A is updated to data item A', the number of clients to receive data item A is reduced by 1 and the number of clients to receive A' is incremented by 1. The updated client information is stored to a recording region such as the RAM 203, the magnetic disk 205, the optical disk 207, etc.

The recording unit 504 has a function of recording information indicating the number of clients, i.e., the sharing count field depicted in FIG. 4, to receive each data item. The recorded information is stored to a recording region such as the RAM 203, the magnetic disk 205, the optical disk 207, etc.

The extracting unit 505 has a function of extracting for each data item to be received by a given client, information indicating the number of clients receiving the data item, the information being extracted from the information indicating the number of clients recorded by the recording unit 504 or updated by the updating unit 503. Further, the information may be extracted for each data item included in a designated file to be received by a client. The extracting unit 505 may execute the extraction after the updating unit 503 has updated the information.

For example, in an extraction related to user A in the index data management table 401 depicted in FIG. 4, the data items to be received by user A include a, b, c and d, e, c, e as indicated by the entity data management indexes of two file indexes. As for the acquired data, the sharing count fields of corresponding records in the entity data management table 402 is the information indicating the number of clients to receive each data item. The extracted information is stored to a recording region such as the RAM 203, the magnetic disk 205, the optical disk 207, etc.

The coincidence calculating unit 506 has a function of calculating the degree of coincidence, by obtaining for each data item, the size of the data item per one client, based on the extracted information for each data item to be received by a given client and indicating the number of clients to receive the data item. A degree of coincidence indicates coincidence of data items used by other clients.

For example, in the case of user A, total file size is calculated as the usage volume for user A. In this example, total file size is $(19+12+8)+(31+4+8+4)=86$. The size of each data item per one client are $a=19/1$, $b=12/3$, $c=8/9$, $d=31/1$, $e=4/80$, $c=8/9$, and $e=4/80$. The total of these values is approximately 55.9. The quotient of usage volume and data item size per client is the degree of coincidence, which is approximately 1.5. The calculated values are stored to a recording region such as the RAM 203, the magnetic disk 205, the optical disk 207, etc.

The charge calculating unit 507 has a function of calculating database charges for a client, based on information for each data item received by the client and indicating the number of clients receiving the data item. Further, charges may be calculated based on the degree of coincidence calculated by the coincidence calculating unit 506.

For example, charges for user B are calculated by independently calculating a fixed amount required irrespective of the usage volume of user B, and a used-amount based on the degree of coincidence. The used-amount is obtained by multiplying the quotient of total file size $(7+9+4+12+7+8)=47$ and the calculated degree of coincidence 1.5 by a suitable coefficient. The calculated values are stored to a recording region such as the RAM 203, the magnetic disk 205, the optical disk 207, etc.

The output unit 506 has a function of outputting the charges calculated by charge calculating unit 507. For example, the calculated charges are transmitted to the user terminal 101-1 through the network 102. The form of output may be, for example, display on the display 208, printout at the printer 213, transmission to an external apparatus via the I/F 209. Further, the charges may be stored to a recording region such as the RAM 203, the magnetic disk 205, the optical disk 207, etc.

Using the group of tables resulting from managing the deduplication program, the management apparatus 105 executes the charge calculating program 106 according to the embodiment and executes usage volume calculation processing, degree of coincidence calculation processing, and charge calculation processing.

FIG. 6 depicts an example of a usage volume table of data usage according to user. The usage volume table includes a time field and a user portion field. A record is added each time the management apparatus 105 calculates usage volume, the time of which is entered into the time field, and the usage volume for each user at that time is respectively recorded. ts is an operation cycle of usage volume calculation processing.

FIG. 7 depicts an example of a degree of coincidence table for data used by each user. The degree of coincidence table includes a time field and a user portion field. A record is added each time the management apparatus 105 calculates a degree of coincidence, the time of which is entered in the time field, and the degree of coincidence is respectively recorded for each user. td is an operation cycle of degree of coincidence calculation processing. Equation 1 hereinafter is an example of a formula for calculating degree of coincidence.

Figure 8:
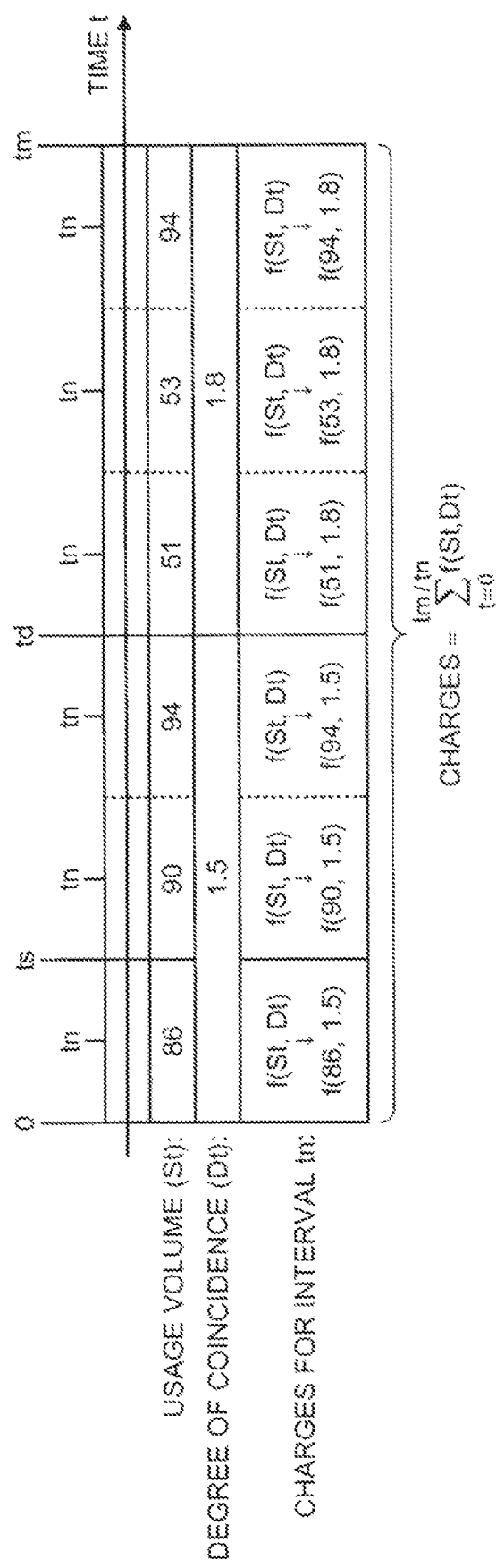
FIG. 8 is a schematic of charge calculation processing for user A.

FIG. 8 is a schematic of charge calculation processing for user A. As depicted in FIGS. 6 and 7, ts and td are the operation cycles for usage volume calculation processing and degree of coincidence calculation processing, respectively. tm is the operation cycle of charge calculation processing. tn is the smallest value among, ts, td, and tm. When charge calculation processing begins, charges are calculated at intervals of tn. In the operation cycles, for example, tm is performed every other day enabling calculation of charges for one day.

For example, during the first interval, the usage volume for user A in the usage table depicted in FIG. 6 is 86 according to the record for which the time field is 0. Similarly, the degree of coincidence for user A in the degree of coincidence table depicted in FIG. 7 is 1.5 according to the record for which the time field is 0. Charges are calculated by a function f(St,Dt) having arguments of usage volume St and degree of coincidence Dt. Thus, the management apparatus 105, after calculating the charges for one interval and the charges for a tm/tn–th interval, obtains the total charges per interval and outputs the result to the output unit 506.

Function f may have a characteristic of increasing with an increase in St and decreasing with an increase in Dt. For example, refer to equations 2 to 4.

The management apparatus 105 uses the usage volume table and the degree of coincidence table to execute usage volume calculation processing, degree of coincidence calculation processing, and charge calculation processing.

Figure 9:
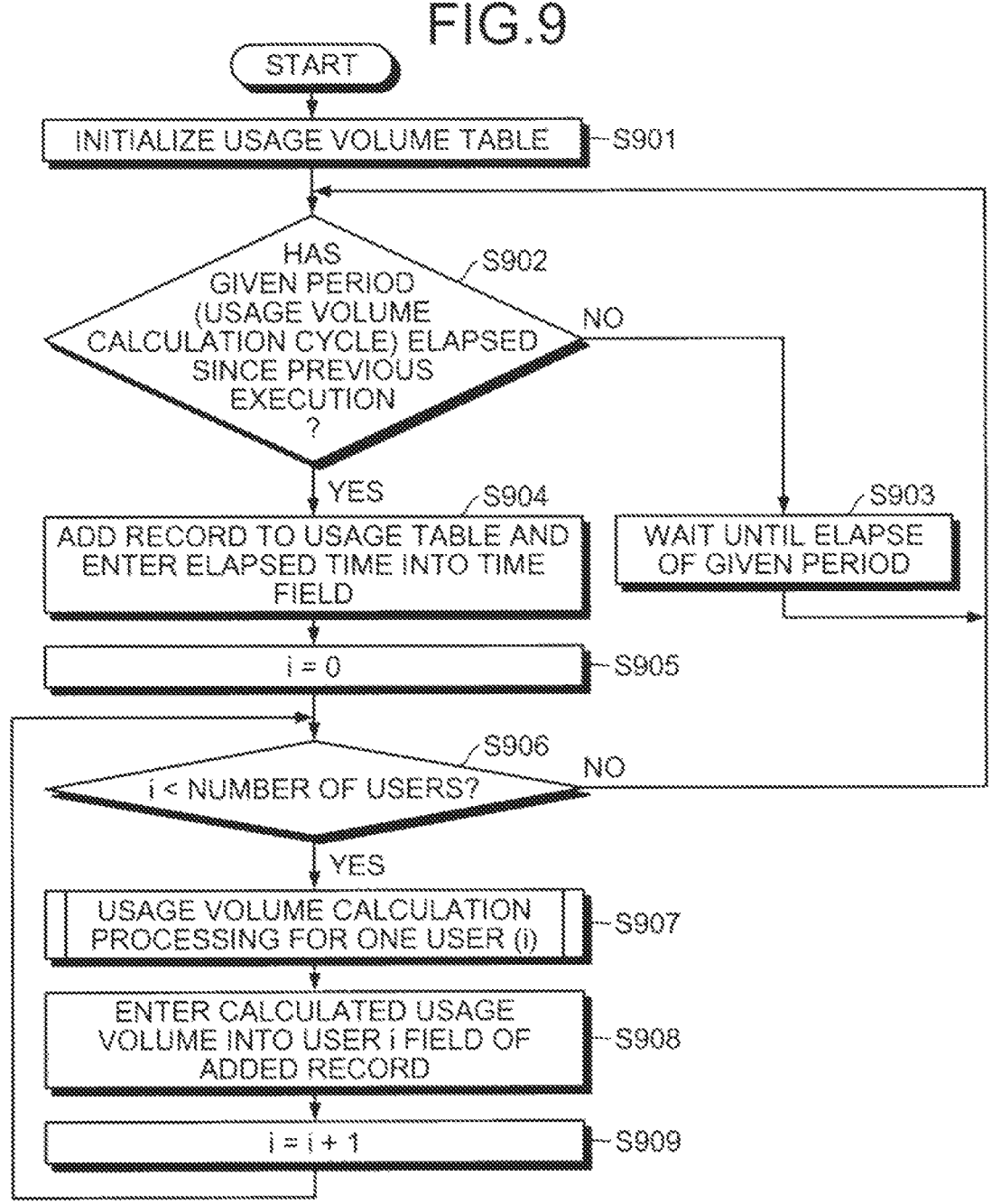
FIG. 9 is a flowchart of usage volume processing.

FIG. 9 is a flowchart of usage volume processing. The management apparatus 105 initializes the usage volume table (step S901). Subsequently, the management apparatus 105 confirms whether a given period of time has elapsed since the previous execution of usage volume calculation processing (step S902). Here, a given period of time is the usage volume calculation cycle ts. If the given period of time has not elapsed (step S902: NO), the management apparatus 105 waits until the given period of time has elapsed (step S903), returning to step S902.

If the given period of time has elapsed (step S902: YES), the management apparatus 105 adds a record to the usage volume table and enters the elapsed time in the time field. (step S904). The management apparatus 105 sets variable i to 0 (step S905). The management apparatus 105 compares i and the number of users (step S906), if i is equal to or greater than the number of users (step S906: NO), the flow returns to step S902.

If i is less than the number of users (step S906: YES), the management apparatus 105 executes usage volume calculation processing for the i-th user (step S907). The management apparatus 105 enters into the user i field of the record added to the usage volume table at step S904, the calculated usage volume (step S908). Subsequently, the management apparatus 105 increments variable i (step S909), and the flow returns to step S906.

Figure 10:
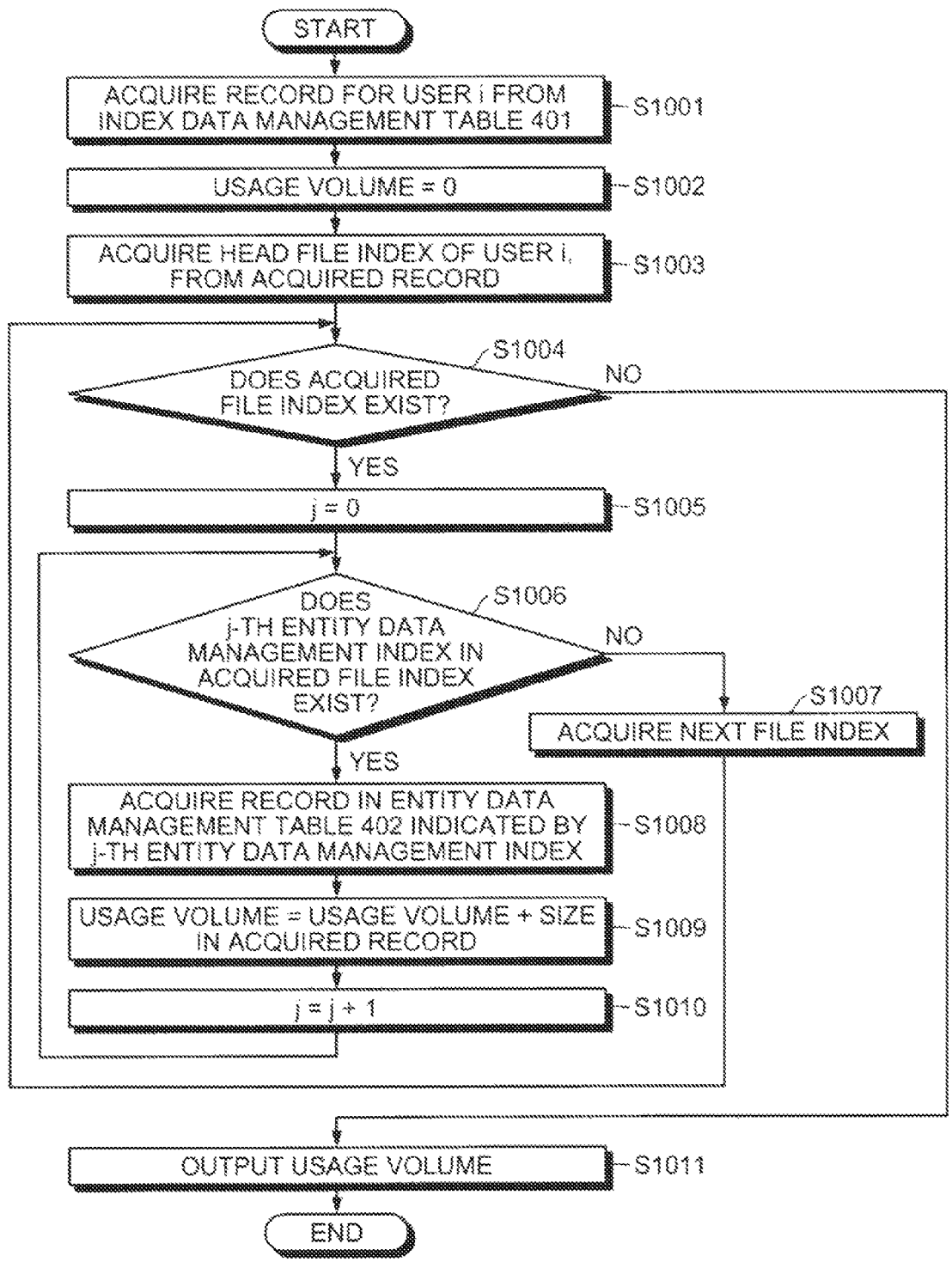
FIG. 10 is a flowchart of usage volume calculation processing for one user.

FIG. 10 is a flowchart of usage volume calculation processing for one user. Usage volume calculation processing for one user, by the argument from the usage volume calculation processing (FIG. 9), acquires variable i as the i-th user for which processing is to be executed. Using the acquired variable i, the management apparatus 105 acquires the record for user i from the index data management table 401 (step S1001). Next, the management apparatus 105 sets, as a variable, the usage volume to 0 (step S1002).

The management apparatus 105, from the record acquired at step S1001, acquires the head file index used by user i (step S1003) and confirms whether the file index exists (step S1004). If the file index does not exist (step S1004: NO), the management apparatus 105 outputs the usage volume (step S1011), ending the function.

If the file index exists (step S1004: YES), the management apparatus 105 prepares and initializes variable j to 0 (step S1005). The management apparatus 105 confirms whether the j-th entity data management index in the acquired file index exists (step S1006). If the j-th entity data management index does not exist (step S1006: NO), the calculation of usage volume for the file is terminated and thus, the management apparatus 105 acquires the next file index used by user i (step S1007). After acquiring the next file index, the management apparatus 105 again confirms whether the file index exists (step S1004).

If the j-th entity data management index exists (step S1006: YES), the management apparatus 105 acquires the record in the entity data management table 402 indicated by the j-th entity data management index (step S1008), and after which the management apparatus 105 adds to the usage volume, the value in the size field of the record (step S1009), and increments variable j (step S1010). The management apparatus 105 executes the processing above with respect to each of the file indexes used by user i.

Figure 11:
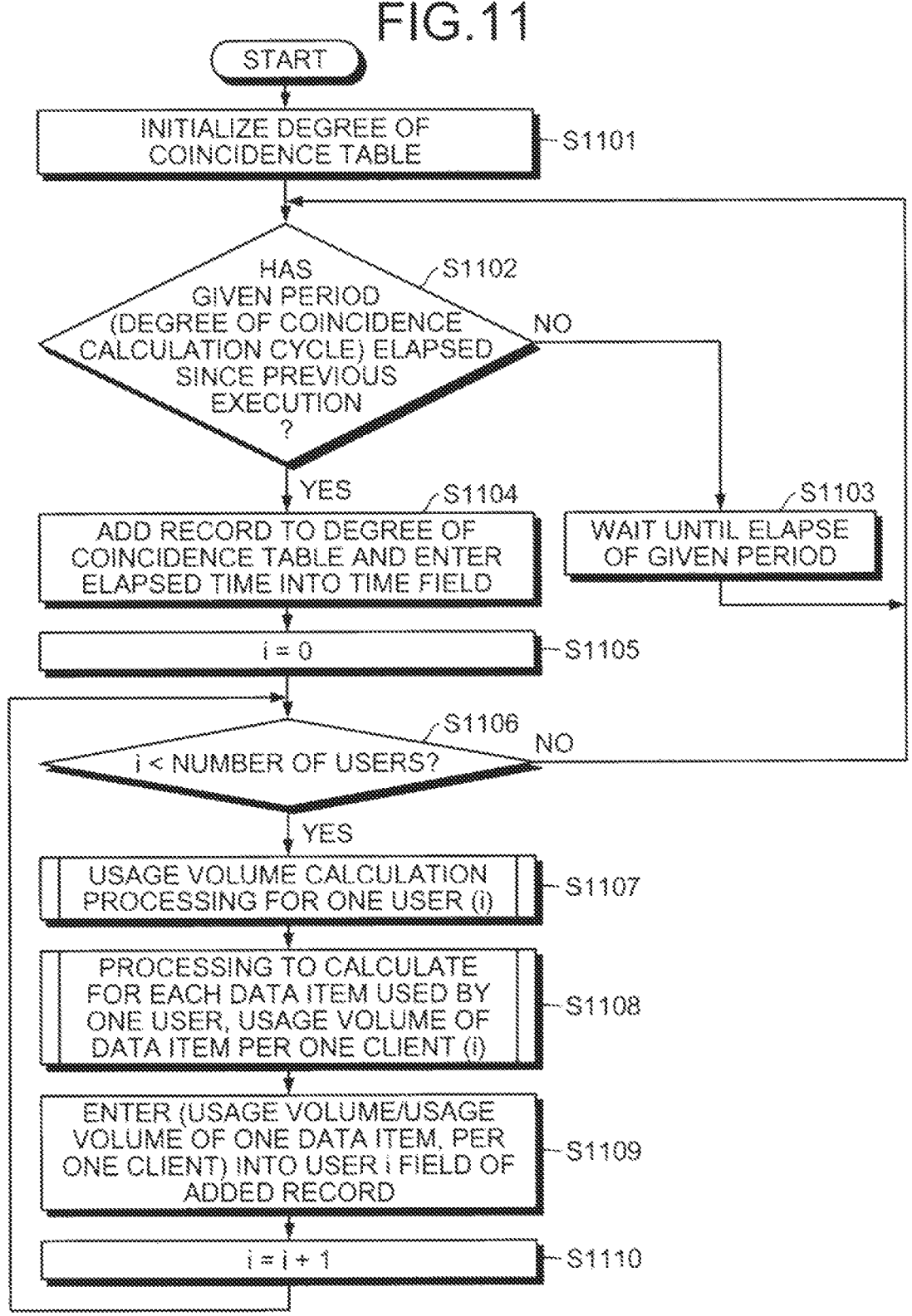
FIG. 11 is a flowchart of degree of coincidence calculation processing.

FIG. 11 is a flowchart of degree of coincidence calculation processing. When degree of coincidence calculation processing is executed, equation 1 hereinafter is used. The management apparatus 105 initializes the degree of coincidence table (step S1101). The management apparatus 105 confirms whether a given period of time has elapsed since the previous execution of the degree of coincidence calculation processing (step S1102). Here, a given period of time is the degree of coincidence calculation cycle td. If the given period of time has not elapsed (step S1102: NO), the management apparatus 105 waits for the given period of time to elapse (step S1103), and again returns to step S1102.

If the given period of time has elapsed (step S1102: YES), the management apparatus 105 adds a record to the degree of coincidence table and enters the elapsed time into the time field (step S1104). Next, the management apparatus 105 sets variable i to 0 (step S1105). The management apparatus 105 compares i and the number of users (step S1106). If i is equal to or greater than the number of users (step S1106: NO), the management apparatus 105 skips the loop operations from step S1106 to step S1110 and returns to step S1102.

If i is less than the number of users (step S1106: YES), the management apparatus 105 executes usage volume calculation processing for the i-th user (step S1107). Usage volume calculation processing for one user is equivalent to the numerator $\Sigma Ds$ in equation 1. The management apparatus 105 executes processing to calculate for each data item used by user i, the usage volume of the data item per one client (step S1108). The processing to calculate for each data item used by user i, the usage volume of the data item per one client, is equivalent to the denominator $\Sigma(Ds/Dc)$ in equation 1.

Next, the management apparatus 105 calculates degree of coincidence by calculating the quotient of the usage volume acquired at step S1107 and the usage volume per one client acquired at step S1108. The management apparatus 105 enters into the user i field of the record added to the degree of coincidence table at step S1104, the calculated degree of coincidence (step S1109) and thereafter, the management apparatus 105 increments variable i (step S1110), and returns to step S1106.

FIG. 12 is a flowchart of usage volume calculation processing to calculate for each data item used by one user, the usage volume of the data item per one client. In the processing, by the argument from the degree of coincidence processing (FIG. 11), variable i is acquired as the i-th user for which processing is to be executed. Using the acquired variable i, the management apparatus 105 acquires the record for user i from the index data management table 401 (step S1201). Next, the management apparatus 105 sets, as a variable, the usage volume of a data item per one client to 0 (step S1202).

The management apparatus 105, from the record acquired at step S1201, acquires the head file index used by user i (step S1203) and confirms whether the file index exists (step S1204). If the file does not exist (step S1204: NO), the management apparatus 105 outputs the usage volume of the data item per one client (step S1211), ending the function.

If the file index exists (step S1204: YES), the management apparatus 105 prepares and initializes variable j to 0 (step S1205). The management apparatus 105 confirms whether the j-th entity data management index in the acquired file index exists (step S1206). If the j-th entity data management index does not exist (step S1206: NO), calculation of the usage volume for the file is terminated and thus, the management apparatus 105 acquires the next file index used by user i (step S1207). After acquiring the next file index, the management apparatus 105 again confirms whether the file index exists (step S1204).

If j-th entity data management index exists (step S1206: YES), the management apparatus 105 acquires the record in the entity data management table indicated by the j-th entity data management index (step S1208), and after which the management apparatus 105 calculates the quotient of the value in the size field of the record acquired for the usage volume of the data item per one client and the value in the sharing count field (step S1209), and increments variable j (step S1210). The management apparatus 105 executes the processing above with respect to each of the file indexes used by user i.

FIG. 13 is a flowchart of charge calculation processing for one user. In the charge calculation processing, charges are calculated for an arbitrary user. The management apparatus 105 confirms whether a given period of time has elapsed since the previous execution of the charge calculation processing (step S1301). Here, the given period of time is the charge calculation cycle tm. If the given period of time has not elapsed (step S1301: NO), the management apparatus 105 waits until the given period of time has elapsed (step S1302), and again returns to step S1301.

If the given period of time has elapsed (step S1301: YES), the management apparatus 105 sets, as tn, the smallest value among the usage volume calculation cycle ts, the degree of coincidence calculation cycle td, and the charge calculation cycle tm (step S1303). The management apparatus 105 sets variable i as the elapsed time minus tm (step S1304). The management apparatus 105 prepares and sets the charges, as a variable, to 0 (step S1305).

The management apparatus 105 compares variable i and the elapsed time (step S1306). If variable i is equal to or greater than the elapsed time (step S1306: NO), the management apparatus 105 outputs the charges (step S1311), ending the processing.

If variable i is less than the elapsed time (step S1306: YES), the management apparatus 105 acquires from the usage volume table, a record for which the time field satisfies "time field"≤i<"time field" of next record. The management apparatus 105 temporarily sets the value of the field corresponding to the user indicated by the acquired record as variable St (step S1307).

Similarly, the management apparatus 105 acquires from the degree of coincidence table, a record for which the time field satisfies "time field"≤i<"time field" of next record and temporarily sets the value of the field corresponding to the user indicated by the acquired record as variable Dt (step S1308). The management apparatus 105 obtains function f(St,Dt) having arguments of usage volume St and degree of coincidence Dt and calculates charges (step S1309). Function f is specifically equations 2 to 4. Finally, to is added to variable i (step S1310), and again the management apparatus 105 returns to step S1306.

As described, the management apparatus 105 according to the embodiment enables billing that reflects the volume of data used on the storage system by a user, by calculating for each data item used by the user, the size of the data item per one client. Therefore, the administrator of the storage system 103 is able to recover costs associated with the storage apparatus 107 without affecting the data utilization state of the user.

Charges may be further calculated using data usage volumes and degree of coincidence based on the size of the data used by a user calculated per one client.

Although a data group may be linked data items forming a file, in the embodiment, even if a data group is a collection of independent files that are not linked, the charge calculating program 106 effectively performs. Further, there is no limit with regard to data type; whether it be a text file, a graphic file, an image file, a moving image file, etc., any format may be used.

Charges can be reduced because the greater the volume of data shared by multiple users is, the less disk space is consumed in the storage system. Consequently, a favorable cycle arises in which users preferentially use coinciding data further reducing the amount of disk spaced consumed in the storage system.

Further, the number of data items to be provided to each client may be acquired and information indicating the number of clients to receive each data item may be updated. Thus, even if there is a change in the amount of disk storage space consumed, the change can be coped with, where a large number of data items shared by multiple users contribute to a reduction in the amount of disk space consumed in the storage system, enabling a reduction in charges as much as possible.

By obtaining the size of each data item per one client, based on information indicating the number of clients for each data item, the degree of coincidence indicative of coincidence of data items used by other clients may be calculated.

Thus, the degree to which usable disk capacity of the storage system is affected is indicated by the value of the degree of coincidence, where a large degree of coincidence contributes to a reduction in the amount of disk space consumed, enabling charges to be reduced as much as possible.

Equation 1 below may be used to calculate degree of coincidence.

$$Dt = \frac{\sum_{n} Ds}{\sum_{n} (Ds/Dc)} \quad (1)$$

Where, Dt is degree of coincidence, n is the total number of data items received by an arbitrary client, Ds is the size of each data item received by an arbitrary client, and Dc is the total number of each data item received by an arbitrary client.

Thus, the degree of coincidence, which indicates the degree to which usable disk capacity of the storage system is affected, is concretely indicated, where a large degree of coincidence contributes to reducing the amount of disk space consumed in the storage system, enabling a reduction in charges as much as possible.

Equation 2 below may be used to calculate charges.

$$Ct = \beta_1 + \alpha_1 \sum_{t}^{tm/tn} (St/Dt) \quad (2)$$

Where, Ct is charges, $\beta_1$ is a constant, $\alpha_1$ is a coefficient, St is the total size of all the data items received by an arbitrary client, Dt is the degree of coincidence, tm is the calculation cycle of equation 2, tn is the smallest value among tm, calculation cycle St, and calculation cycle Dt, and t is the time.

Thus, charges can be calculated using the degree of coincidence, which indicates the degree to which usable disk capacity of the storage system is affected, where a large degree of coincidence contributes to reducing the amount of disk space consumed, thereby enabling a linear reduction in charges. Equation 2 is a charging method that is easily understood by the user. Reduction of the amount of disk space consumed enables a reduction in charges as much as possible.

Equation 3 may be used to calculate charges.

$$Ct = \beta_2 + \alpha_2 \log\left(\sum_{t}^{tm/tn} (St/Dt)\right) \quad (3)$$

Where, Ct is charges, $\beta_2$ is a constant, $\alpha_2$ is a coefficient, St is the total size of all the data items received by an arbitrary client, Dt is the degree of coincidence, tm is the calculation cycle of equation 3, tn is the smallest value among tm, calculation cycle St, and calculation cycle Dt, and t is the time.

Thus, charges can be calculated using the degree of coincidence, which indicates the degree to which usable disk capacity of the storage system is affected, where a large degree of coincidence contributes to reducing the amount of disk space consumed, thereby enabling a reduction in charges according to a logarithmic function. Equation 3 is particularly advantageous for large capacity storage systems.

For example, assuming user A uses a text document of 1 kilobyte and user B uses a moving image of 1 gigabyte, by substituting bytes for the unit of St in equation 2, charges for user B are $10^6$ times that for user A, an impractical value. If the calculation is performed with equation 3, the charges for user B are 3 times that for user A, a practical value. Thus, if there is a large difference in usage volume among users, the usage volume for a user is calculated logarithmically, enabling the calculation of charges that correspond to the large difference in usage volume. Further, by reducing the amount of disk space consumed in the storage system, charges can be reduced as much as possible.

Equation 4 may be used to calculate charges.

$$Ct = \begin{cases} Y_1 & \left(\sum_{t}^{tm/tn} (St/Dt) < X_1\right) \\ Y_k & \left(X_{k-1} \leq \sum_{t}^{tm/tn} (St/Dt) < X_k\right) \end{cases} \quad (4)$$

Where, Ct is charges, St is the total size of all the data items received by an arbitrary client, Dt is the degree of coincidence, tm is the calculation cycle of equation 4, tn is the smallest value among tm, calculation cycle St, and calculation cycle Dt, and t is the time. Further, $X_1, X_2, \ldots X_k$ are thresholds corresponding to the sum of the quotients of St and Dt, and $Y_1, Y_2, \ldots Y_k$ are usage charges corresponding to $X_1, X_2, \ldots X_k$.

Thus, charges can be calculated using the degree of coincidence, which indicates the degree to which usable disk capacity of the storage system is affected, where a large degree of coincidence contributes to reducing the amount of disk space consumed, thereby enabling a stepwise reduction in charges. Here, there is no upper limit on charges with respect to equations 2 and 3. Whereas, for equation 4, by a stepwise calculation of charges, for example, if a given usage volume is exceeded, the charges can be set to a fixed amount. Therefore, since charges exceeding a given upper limit will not be assessed, the user can have a sense of reassurance. Further, by reducing the amount of disk space consumed, charges can be reduced as much as possible for the user.

The calculation cycle for the usage volume of a user may be shorter than the calculation cycle for the degree of coincidence. Hence, in the calculation of charges, when the processing load is small and the variation in values is great, the usage volume calculation cycle is made shorter; when the processing load is large and the variation in values is small, the degree of coincidence calculation cycle is made longer. Therefore, with a small processing load, calculation of charges in substantially real-time can be made according to variations in data over time consequent to the state of utilization by the user.

The charge calculating method described in the present embodiment may be implemented by executing a prepared program on a computer such as a personal computer and a workstation. The program is stored on a non-transitory computer-readable recording medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a charge calculating program causing a computer that manages a database of different data items to execute:

recording for each data item, information indicating the number of clients that receive the data item;

extracting from the information recorded at the recording and for each data item to be received by a given client, information indicating the number of clients receiving the data item;

calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n} (Ds/Dc)}$$

where, Dt is the degree of coincidence, n is the total number of data items received by the given client, Ds is the size of each data received by the given client, and Dc is the total number of each data item received by the given client;

calculating charges for the given client, based on the extracted information wherein the calculating charges includes calculating for the given client and based on the calculated degree of coincidence, charges for the database; and outputting the calculated charges.

2. The non-transitory computer-readable recording medium according to claim 1 and storing therein the charge calculating program causing the computer to further execute:

acquiring for each client, the number of data items provided to the client; and updating based on the acquired number, the information indicating for each data item, the number of clients receiving the data item, wherein the extracting includes extracting the information from the updated information.

3. The non-transitory computer-readable recording medium according to claim 1, wherein the charges are calculated by equation 2:

$$Ct = \beta_1 + \alpha_1 \sum_{t}^{tm/tn} (St/Dt)$$

where, Ct is the charges, $\beta_1$ is a constant, $\alpha_1$ is a coefficient, St is the total size of all the data items received by the given client, Dt is the degree of coincidence, tm is a calculation cycle of equation 2, to is the smallest value among tm, a calculation cycle St and a calculation cycle Dt, and t is the time.

4. The non-transitory computer-readable recording medium according to claim 3, wherein a calculation cycle for calculating the total size of the data items received by the given client is shorter than a calculation cycle for calculating the degree of coincidence.

5. A non-transitory computer-readable recording medium storing therein a charge calculating program causing a computer that manages a database of different data items that are elements of a file, to execute:

recording for each data item, the number of clients that receive the data item;

extracting based on the information recorded at the recording, the information for each data item included in a designated file to be received by a given client;

calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n} (Ds/Dc)}$$

where, Dt is the degree of coincidence, n is the total number of data items received by the given client, Ds is the size of each data received by the given client, and Dc is the total number of each data item received by the given client;

calculating for the given client and based on the extracted information, charges for the database wherein the calculating charges includes calculating for the given client and based on the calculated degree of coincidence, charges for the database; and outputting the calculated charges.

6. A charge calculating apparatus that manages a database of different data items, comprising:

a memory configured to record for each data item, information indicating the number of clients that receive the data item; and a processor configured to execute a procedure, the procedure comprising:

extracting from the information recorded in the memory and for each data item to be received by a given client, information indicating the number of clients receiving the data item;

calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n} (Ds/Dc)}$$

where, Dt is the degree of coincidence, n is the total number of data items received by the given client, Ds is the size of each data received by the given client, and Dc is the total number of each data item received by the given client;

calculating charges for the given client, based on the extracted information wherein the calculating charges includes calculating for the given client and based on the calculated degree of coincidence, charges for the database; and outputting the calculated charges.

7. A charge calculating apparatus that manages a database of different data items that are elements of a file, comprising:
a memory configured to record for each data item, the number of clients that receive the data item; and
a processor configured to execute a procedure, the procedure comprising:
extracting the information for each data item included in a designated file to be received by a given client based on the information recorded in the memory;
calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n}(Ds/Dc)}$$

where, Dt is the degree of coincidence, n is the total number of data items received by the given client, Ds is the size of each data received by the given client, and Dc is the total number of each data item received by the given client;
calculating for the given client and based on the extracted information, charging for the database wherein the calculating charges includes calculating for the given client and based on the calculated degree of coincidence, charges for the database; and
outputting the calculated charges.

8. A charge calculating method of a computer that includes a memory that with respect to data items that are different and stored in a database, records for each data item, information indicating the number of clients that receive the data item and a processor, the charge calculating method comprising:
extracting from the information recorded by the memory and for each data item to be received by a given client, information indicating the number of clients receiving the data item, the extracting being performed by the processor;
calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n}(Ds/Dc)}$$

where, Dt is the degree of coincidence, n is the total number of data items received by the given client, Ds is the size of each data received by the given client, and Dc is the total number of each data item received by the given client, the calculating being performed by the processor;
calculating charges for the given client, based on the extracted information wherein the calculating charges includes calculating for the given client and based on the calculated degree of coincidence, charges for the database, the calculating being performed by the processor; and
outputting, via the processor, the calculated charges.

9. A charge calculating method of a computer that includes a memory that with respect to different data items that are elements of a file and stored in a database, records for each data item, information indicating the number of clients that receive the data item and a processor, the charge calculating method comprising:
extracting based on the information recorded by the memory, the information for each data item included in a designated file to be received by a given client, the extracting being performed by the processor;
calculating degree of coincidence by obtaining for each data item, the size of the data item per one client, based on the information indicating for each data item, the number of clients receiving the data item, the degree of coincidence indicating coincidence of data items used by other clients and being calculated by equation 1:

$$Dt = \frac{\sum_{n}^{n} Ds}{\sum_{n}^{n}(Ds/Dc)}$$

where, Dt is the degree of coincidence, n is the total number of data items received by the given client, Ds is the size of each data received by the given client, and Dc is the total number of each data item received by the given client, the calculating being performed by the processor;
calculating for the given client and based on the extracted information, charges for the database wherein the calculating charges includes calculating for the given client and based on the calculated degree of coincidence, charges for the database, the calculating being performed by the processor; and
outputting, via the processor, the calculated charges.

* * * * *